(12) United States Patent
Schuemann et al.

(10) Patent No.: US 11,072,313 B2
(45) Date of Patent: Jul. 27, 2021

(54) MOTOR VEHICLE

(71) Applicant: Dr. Ing. h.c. F. Porsche Aktiengesellschaft, Stuttgart (DE)

(72) Inventors: Hannes Schuemann, Leonberg (DE); Jakob Weissert, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 162 days.

(21) Appl. No.: 16/551,806

(22) Filed: Aug. 27, 2019

(65) Prior Publication Data
US 2020/0094792 A1 Mar. 26, 2020

(30) Foreign Application Priority Data
Sep. 21, 2018 (DE) .................... 10 2018 123 300.0

(51) Int. Cl.
*B60T 5/00* (2006.01)
*B60G 11/22* (2006.01)
*F16D 65/847* (2006.01)
*B62D 25/20* (2006.01)
*B60G 7/00* (2006.01)

(52) U.S. Cl.
CPC ................ *B60T 5/00* (2013.01); *B60G 7/001* (2013.01); *B60G 11/22* (2013.01); *B62D 25/2009* (2013.01); *F16D 65/847* (2013.01)

(58) Field of Classification Search
CPC ........... B60T 5/00; B60G 7/001; B60G 11/22; F16D 65/847; F16D 65/84; B62D 25/2009
USPC ...................................... 188/264 A, 264 AA
See application file for complete search history.

(56) References Cited

U.S. PATENT DOCUMENTS

| 4,805,747 A | 2/1989 | Moedinger et al. |
| 2011/0309652 A1 | 12/2011 | Eichentopf et al. |
| 2013/0249182 A1 | 9/2013 | Moessinger |
| 2015/0345578 A1 * | 12/2015 | Nightingale ......... B62D 35/008 188/264 AA |
| 2016/0048434 A1 | 2/2016 | Bibelhausen et al. |

(Continued)

FOREIGN PATENT DOCUMENTS

| DE | 3630334 A1 | 3/1988 | |
| DE | 102008039728 A1 * | 3/2010 | ............. F16D 65/78 |
| DE | 102010004532 A1 | 8/2010 | |

(Continued)

*Primary Examiner* — Melanie Torres Williams
(74) *Attorney, Agent, or Firm* — Leydig, Voit & Mayer, Ltd.

(57) ABSTRACT

A motor vehicle having: running gear having a chassis and wheel suspensions, which include longitudinal and transverse links for attaching wheels to the chassis; a body having an underfloor and/or an underfloor paneling, the underfloor and/or the underfloor paneling exposing the links; paneling for the links having a recess for air to cool a brake; and a flow guide upstream of a respective paneling. The flow guide is connected to the underfloor or to underfloor paneling and which, together with the respective paneling, divides up the air flow into: a first air flow, which can be fed, upstream of the recess, via a first flow channel of the respective paneling to a first region of the brake, and into a second air flow, which can be fed via the recess of the respective paneling and a second flow channel of the respective paneling to a second region of the brake.

9 Claims, 3 Drawing Sheets

(56) References Cited

U.S. PATENT DOCUMENTS

2016/0272258 A1* 9/2016 Gibson ................. B62D 37/02
2017/0050624 A1* 2/2017 Paul ........................ B60T 5/00

FOREIGN PATENT DOCUMENTS

| DE | 102009014967 A1 * | 9/2010 | ................ B60T 5/00 |
| DE | 102012102436 A1 | 9/2013 | |
| DE | 102013103380 A1 | 10/2014 | |
| DE | 102013108380 A1 * | 2/2015 | ........... F16D 65/847 |
| DE | 102013112466 A1 | 5/2015 | |
| EP | 2435288 B1 | 7/2013 | |
| FR | 3037022 B1 * | 7/2017 | ........... B62D 35/005 |

* cited by examiner

MOTOR VEHICLE

CROSS-REFERENCE TO PRIOR APPLICATIONS

Priority is claimed to German Patent Application No. DE 10 2018 123 300.0, filed on Sep. 21, 2018, the entire disclosure of which is hereby incorporated by reference herein.

FIELD

The invention relates to a motor vehicle.

BACKGROUND

The basic construction of motor vehicles is known from practice. Motor vehicles have, inter alia, a running gear and a body structure.

The running gear of a motor vehicle has a chassis and has wheel suspensions, which include links, for the attachment of wheels to the chassis.

The body structure has an underfloor and/or an underfloor paneling.

DE 10 2013 112 466 A1 discloses a wheel suspension that includes a wheel carrier for a wheel, which wheel carrier engages on a chassis subframe via transverse links and longitudinal links of the wheel suspension. A further wheel suspension with upper and lower longitudinal links and upper and lower transverse links are disclosed in DE 10 2012 102 436 A1.

DE 10 2010 004 532 A1 has disclosed a motor vehicle in the case of which a link arrangement, which serves for the pivotable attachment of a vehicle wheel to a chassis, has a multiplicity of links. Such a link arrangement includes a pivot means by which the vehicle wheel is pivotable. A paneling part engages on said pivot means. The paneling part is movable together with the pivot means. The paneling part has a recess or opening via which air for cooling purposes can be fed when required to a brake which is assigned to the vehicle wheel.

EP 2 435 288 B1 has disclosed a motor vehicle, the body structure of which has an underfloor. In the region of a rear axle of the running gear of the motor vehicle, there are provided air guide devices which are provided on a transverse link of the corresponding wheel suspension. Said air guide devices serve for conducting cooling air in the direction of a fuel tank of the motor vehicle.

DE 10 2013 103 380 A1 has disclosed a wheel suspension for the attachment of wheels of a motor vehicle, which wheel suspension has longitudinal links and transverse links. A first air guide channel engages on a longitudinal link and a separate second air guide channel engages on a transverse link. Via the two air guide channels, which each engage individually on different links of the wheel suspension, air can be conducted in the direction of a wheel carrier.

All of the embodiments known from the prior art, with which either longitudinal links and transverse links of a wheel suspension are provided with a paneling or with which cooling air is conducted in the direction of a wheel carrier or a brake, either have aerodynamic disadvantages or have restricted possibilities for the cooling of the brake which is assigned to the respective wheel carrier or wheel.

SUMMARY

A motor vehicle, the motor vehicle having: running gear, the running gear including a chassis and wheel suspensions, the wheel suspensions including longitudinal links and transverse links and being for the attachment of wheels to the chassis; a body structure, which has an underfloor and/or an underfloor paneling, the underfloor and/or the underfloor paneling exposing the longitudinal links and the transverse links of the wheel suspensions; separate paneling parts for the longitudinal links and the transverse links of the wheel suspensions, each of the respective paneling parts having a recess via which air can be fed for cooling purposes to a brake which corresponds to a respective one of the wheels; and a flow guide element upstream of a respective separate paneling part of the paneling parts as viewed in a flow direction of the air. The flow guide element is connected to the underfloor or to the underfloor paneling and which, together with the respective separate paneling part, divides up the air flow into: a first air flow, which can be fed, upstream of the recess, via a first flow channel of the respective separate paneling part to a first region of the respective brake, and into a second air flow, which can be fed via the recess of the respective separate paneling part and via a second flow channel of the respective separate paneling part to a second region of the respective brake.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
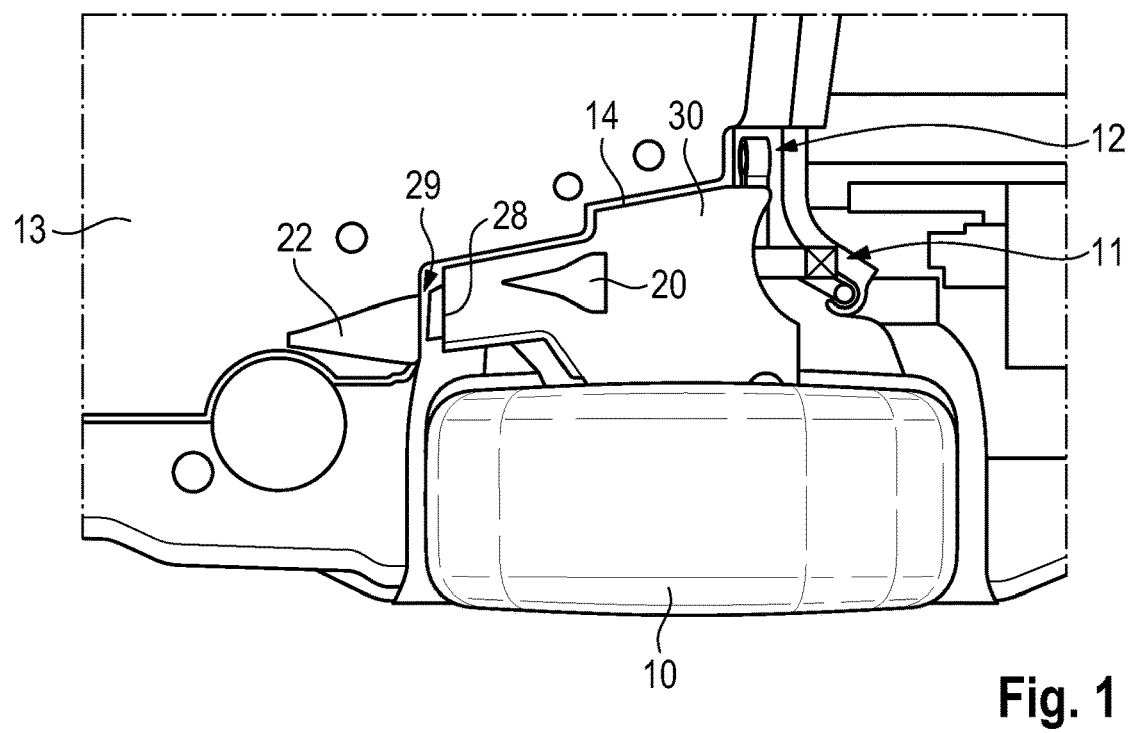
FIG. 1 shows a detail of a motor vehicle according to the invention in the region of a wheel and of an underfloor paneling in a viewing direction from below.

Embodiments of the present invention provide a novel motor vehicle which has improved aerodynamics and improved cooling of the brakes.

According to the first aspect of the invention, upstream of the respective separate paneling part as viewed in a flow direction of the cooling air, there is arranged a flow guide element which is connected to the underfloor and to the underfloor paneling of the underfloor and which, together with the paneling part, divides up the air flow, specifically into a first air flow, which for cooling purposes can be fed, upstream of the recess of the respective paneling part, via a first flow channel of the paneling part to a first region of the respective brake, and into a second air flow, which for cooling purposes can be fed via the recess of the respective paneling part and via a second flow channel of the paneling part to a second region of the respective brake.

According to the first aspect of the invention, it is accordingly the case that, upstream of the respective separate paneling part which serves for the paneling of the longitudinal links and transverse links of the respective wheel suspension, there is arranged a flow guide element which is connected to the underfloor or to the underfloor paneling of the underfloor.

According to the first aspect of the invention, the cooling air flow is divided up by the separate paneling part in interaction with the flow guide element arranged upstream thereof, specifically into the first cooling air flow, which can be fed, upstream of the recess of the respective paneling part, via a first flow channel of the paneling part to a first region of the respective wheel or wheel carrier and thus to the brake, and into the second cooling air flow, which can be fed via the recess of the respective paneling part and via a second flow channel of the paneling part to a second region of the respective wheel or wheel carrier and thus to the brake.

By means of the paneling of the links of the respective wheel suspension with the separate paneling part and the flow guide element which is positioned upstream of the separate paneling part and which is connected to the underfloor and to the underfloor paneling, it is possible to ensure firstly optimum aerodynamics in the region of the underfloor and of the wheel suspensions and secondly brake cooling, in particular optimum cooling of a brake which is assigned to the respective wheel or wheel carrier. Both the respective separate paneling part and the flow guide element positioned upstream thereof only have a minimal adverse effect on the aerodynamics in the region of the underfloor or of the wheel suspensions. Via the two flow channels provided by the paneling part, the divided-up cooling air can be conducted in the direction of different regions of the respective wheel and thus brake, in order to thus ensure optimum cooling.

In a preferred embodiment of the first aspect of the invention, the second flow channel of the respective paneling part runs downstream of the first flow channel as viewed in the flow direction of the cooling air, wherein the second cooling air flow conducts air to the second region of the respective wheel and thus of the brake, which is arranged downstream of the first region of the respective wheel and thus of the brake as viewed in the flow direction of the cooling air.

The first flow channel and the second flow channel form a unipartite monolithic assembly together with the paneling part. By virtue of the fact that both flow channels are provided by the respective paneling part, a particularly simple attachment of the assemblies to the wheel suspension is possible. The aerodynamics and the cooling are also further improved.

According to the second aspect of the invention, the respective separate paneling part is fastened at one side to a transverse link of the respective wheel suspension and at the other side to a longitudinal link of the respective wheel suspension, specifically fixedly or rigidly to one of said links and movably or flexibly to another of said links, in order, firstly, to be movable together with said links of the respective wheel suspension relative to the underfloor and/or the underfloor paneling and, secondly, to permit a relative movement between said links of the respective wheel suspension.

With a single paneling part in the region of the respective wheel suspension, it is thus possible to ensure firstly good aerodynamics and secondly good wheel cooling or cooling of the brake which is assigned to the wheel or wheel carrier. By virtue of the fact that the respective separate paneling part is arranged on the links on the one hand fixedly or rigidly and on the other hand movably or flexibly, it is the case despite the attachment of the paneling part to two links, specifically both to a longitudinal link and to a transverse link, that a relative movement between transverse link and longitudinal link is possible.

According to a preferred embodiment of the second aspect of the invention, the respective paneling part is fastened movably or flexibly to a lower transverse link of the respective wheel suspension and is fastened fixedly or rigidly to a lower longitudinal link of the respective wheel suspension. This attachment of the respective paneling part to the links of the respective wheel suspension is particularly preferred.

According to a further preferred embodiment of the second aspect of the invention, the movable or flexible fastening is realized by means of a resiliently elastic suspension. With such a resiliently elastic suspension, the flexible or movable fastening of the paneling part preferably to the lower transverse link of the respective wheel suspension can be provided in a particularly advantageous manner.

It is preferable for both aspects according to the invention to be used in combination with one another on a motor vehicle, in order to jointly permit improved aerodynamics and improved cooling of the brake of the respective wheel.

Preferred embodiments of the invention will emerge from the following description. Exemplary embodiments of the invention will, without restriction to these, be discussed in more detail on the basis of the drawings.

The invention relates to a motor vehicle. FIG. 1 shows a detail of a motor vehicle from below in the region of a wheel 10 of the motor vehicle.

The wheel 10, which can be seen in FIG. 1, is attached to a chassis 12 of the motor vehicle by means of a wheel suspension 11, which has a wheel carrier 15 and lower longitudinal links 25*u* and upper longitudinal links and also lower transverse links 24*u* and upper transverse links. The wheel carrier 15 and the longitudinal links 25*u* and transverse links 24*u* are not visible in FIG. 1 but can be seen in FIGS. 3 and 4.

The chassis 12 and wheel suspension 11 are constituent parts of a so-called running gear of the motor vehicle.

The expressions "lower longitudinal link", "lower transverse link" and "upper longitudinal link", "upper transverse link" relate to the installed situation of the longitudinal links 25*u* and transverse links 24*u* on the motor vehicle. Lower links 24*u*, 25*u* have a smaller spacing to the roadway than upper links. The lower links 24*u*, 25*u* may also be referred to as first links, and the upper links may be referred to a second links, wherein the upper links are not illustrated in the figures for the sake of clarity.

Figure 3:
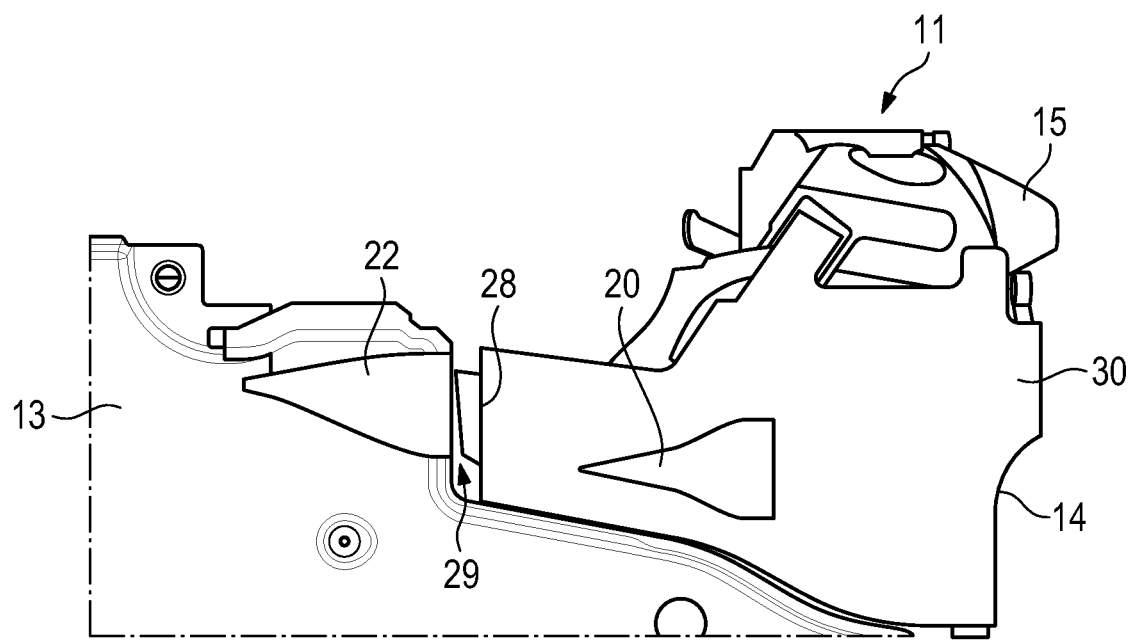
FIG. 3 shows a detail of a motor vehicle according to the invention analogous to FIG. 1, but without a wheel.
Figure 4:
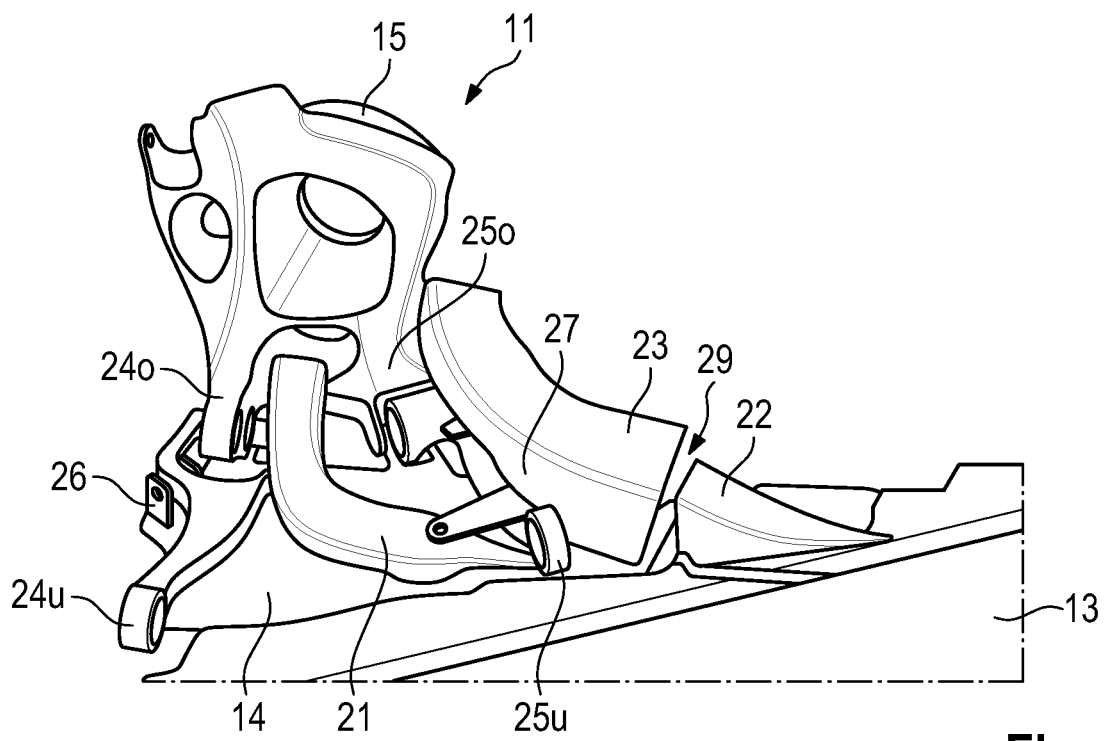
FIG. 4 shows the detail of FIG. 3 in a perspective view.
Figure 5:
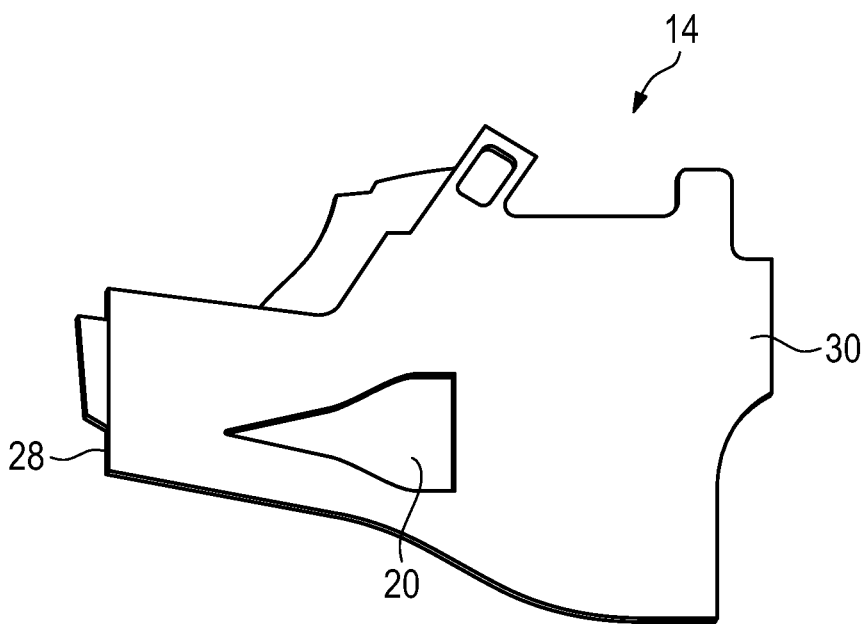
FIG. 5 shows a separate paneling part of the motor vehicle in a view from below.
Figure 6:
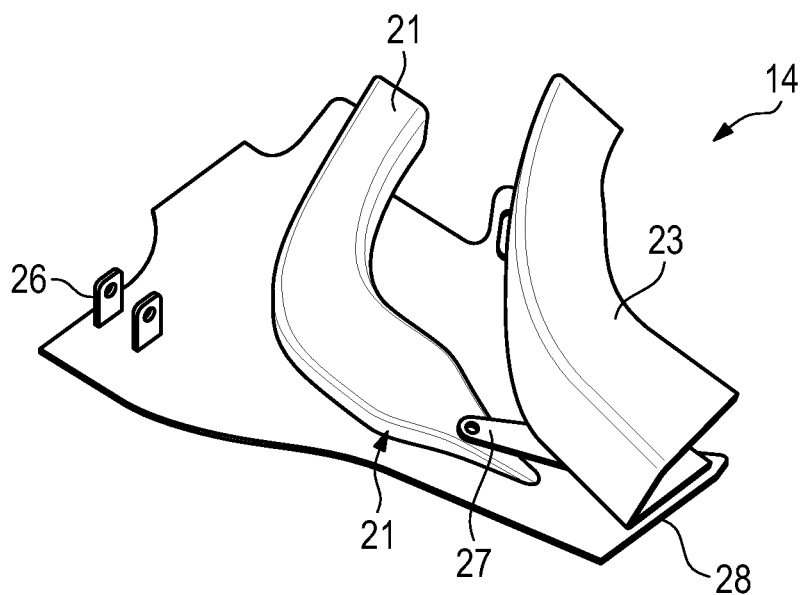
FIG. 6 shows the separate paneling part of FIG. 5 in a perspective view.

FIGS. 1, 3 and 4 furthermore show an underfloor paneling 13 of the motor vehicle, which covers an underfloor of a body structure of the motor vehicle. Said underfloor paneling 13 exposes the wheel suspension 11 of the wheel 10, in particular the longitudinal links 25*u* and transverse links 24*u* of the respective wheel suspension 11, which together form a link arrangement.

The link arrangement or the longitudinal links 25*u* and transverse links 24*u* of the respective wheel suspension 11 are, as per FIGS. 1, 3 and 4, covered by a separate paneling part 14.

Figure 2:
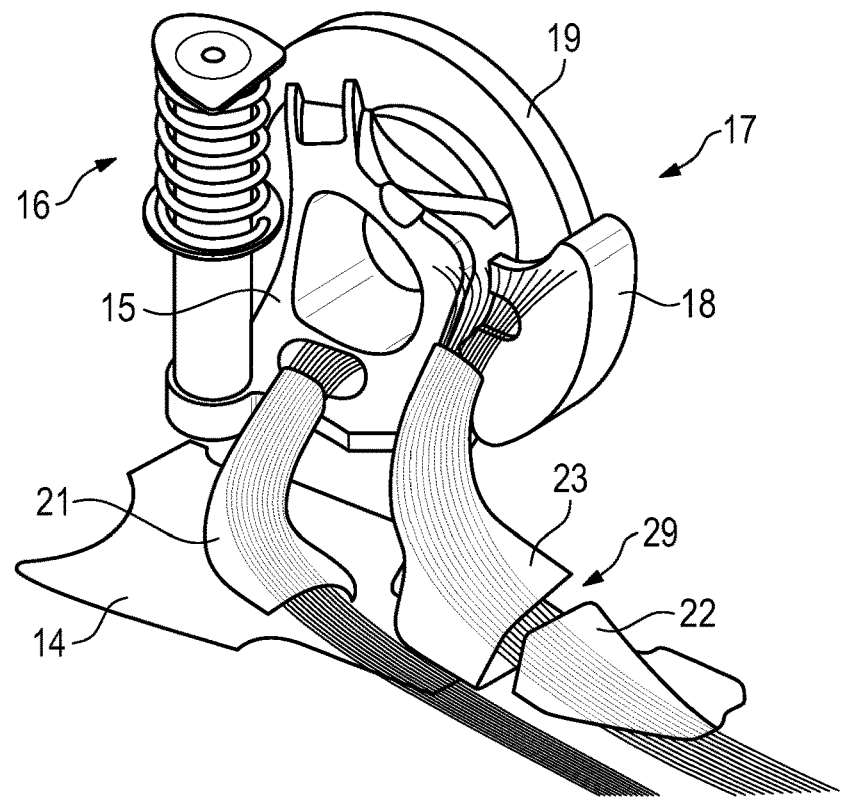
FIG. 2 shows a detail of a motor vehicle according to the invention in the region of a wheel carrier and of a brake in a viewing direction obliquely from above.

FIGS. 2 and 4 each show a detail of the arrangement of FIG. 1 in a view obliquely from above, wherein FIG. 2 shows the separate paneling part 14 and a wheel carrier 15 for the wheel 10 and a spring-damper system 16 for the wheel 10. FIG. 2 furthermore shows assemblies of a brake 17 which is assigned to the respective wheel carrier 15 of the wheel 10, specifically a brake caliper 18 and a brake disk 19 of the brake 17. In FIG. 4, it is possible in particular to see the longitudinal links 25u and transverse links 24u.

The paneling part 14 has a recess 20 in a flow-guiding surface 30, wherein, via said recess 20, air or cooling air can be fed to the wheel 10 or to the wheel suspension 15 of the wheel 10 and thus to the brake 17 which is assigned to the wheel 10 or wheel suspension 15. Here, said recess 20 communicates with a flow channel 21 of the paneling part 14, which has a curved or arcuate contour and which, as per FIG. 2, conducts a second cooling air flow in the direction of the brake 17.

In an installed situation, the flow-guiding surface 30 of the paneling part 14, into which the recess 20 is formed, faces toward a roadway and extends in the plane or approximately in the plane of the underfloor or of the underfloor paneling 13.

As viewed in the flow direction of the air or cooling air, a flow guide element 22 which is connected to the underfloor or to the underfloor paneling 13 is arranged upstream of the separate paneling part 14. Said flow guide element 22 together with an upstream edge 28 of the respective paneling part 14 divides up the air flow or cooling air flow.

A first air flow or cooling air flow, which is branched off between paneling part 14 and flow guide element 22 upstream of the recess 20 of the paneling part 14, can be fed via a first flow channel 23 of the paneling part 14 to a first region of the respective wheel and thus of the brake 17, in particular to the brake caliper 18 of the brake 17.

Between the upstream edge 28 of the paneling part 14 and the flow guide element 22 positioned upstream thereof, there is formed an opening 29 via which the first air flow or cooling air flow can be fed to the first flow channel 23 of the paneling part 14.

As can be seen most clearly from FIGS. 2, 3 and 4, the flow guide element 22 defines a ramp-like flow guide surface, specifically such that, as viewed in the flow direction of the air or cooling air, the spacing of the ramp-like flow guide surface of the flow guide element 22 from the underfloor paneling 13 is increased. The ramp-like flow guide surface of the flow guide element 22 forms an inflow funnel for the first flow channel 23 of the paneling part 14.

The abovementioned air flow or cooling air flow conducted by the recess 20 of the respective paneling part 14, which will hereinafter be referred to as second air flow or cooling air flow, can be fed via the abovementioned flow channel 21, which will hereinafter be referred to as second flow channel 21, to a second region of the respective wheel and thus of the brake 17, preferably to a region of the brake disk 19 of the brake 17.

The two flow channels 21 and 23 are integral constituent parts of the paneling part 14. The two flow channels 21 and 23 are formed on a side of the paneling part 14 which is situated opposite the flow-guiding surface 30. The two flow channels 21 and 23 of the paneling part 14 each have a curved contour. The second flow channel 21, which communicates with the recess 20, runs, as viewed in the flow direction, downstream of the first flow channel 23, which communicates with the flow guide element 22 and with the opening 29 between the flow guide element 22 and the paneling part 14.

The first flow guide channel 23, which communicates with the flow guide element 22, conducts the first air flow or cooling air flow into the region of the brake caliper 18, shown in FIG. 2, of the brake 17.

The second flow channel 21, which communicates with the recess 20 of the paneling part 14, conducts the second air flow or cooling air flow to a region, spaced apart therefrom, of the brake disk 19 of the brake 17.

Accordingly, in the region of the wheel 10 shown in FIG. 1, there are positioned two interacting assemblies which optimize firstly the aerodynamics in the region of the respective wheel 10 and secondly the cooling air flow guidance. By means of the paneling part 14, transverse link 24u and longitudinal link 25u of the respective wheel suspension 11 are aerodynamically covered. Upstream of said paneling part 14, there is positioned the flow guide element 22, which is connected to the underfloor paneling 13 or to the underfloor.

The flow guide element 22 together with the paneling part 14 divides up the air flow or cooling air flow, specifically into the first air flow or cooling air flow, which, upstream of the recess 20 of the paneling part 14, is fed via the first flow channel 23 of the paneling part 14 to the first region of the brake 17, and into the second air flow or cooling air flow, which is fed via the recess 20 of the paneling part 14 and the second flow channel 21 to a second region of the brake 17.

Here, the two flow channels 21 and 23 are integral constituent parts of the paneling part 14. Only two assemblies have to be installed in the region of the respective wheel 10, specifically the respective paneling part 14 and the respective flow guide element 22 as a constituent part of the underfloor paneling.

The respective paneling part 14 is mounted on, or is a constituent part of, or is integrated into, the link arrangement of the respective wheel suspension 11, and the respective flow guide element 22 is mounted on, or is a constituent part of, or is integrated into, the underfloor or the underfloor paneling 13.

By means of the invention, it is accordingly firstly the case that simple coverage of chassis parts is realized, and the aerodynamics are improved. Additionally, with minimal influence on the aerodynamics, the ventilation and thus cooling of the respective brake are improved.

As already stated, the respective paneling part 14 is connected to the link arrangement of the respective wheel suspension 11 of the respective wheel 10. Here, the respective paneling part 14 is fastened at one side to a transverse link 24u of the respective wheel suspension 11 and at the other side to a longitudinal link 25u of the respective wheel suspension 11.

The respective paneling part 14 is in this case fastened fixedly or rigidly to one of said links and movably or flexibly to another of said links. In this way, the paneling part 14 is firstly movable together with the links 24u, 25u of the respective wheel suspension 11 relative to the underfloor of the underfloor paneling 13, and secondly, in this way, a relative movement between the links 24u, 25u of the wheel suspension 11, that is to say between longitudinal link and transverse link, is permitted.

The respective paneling part 14 is preferably fastened movably or flexibly to a lower transverse link 24u of the respective wheel suspension 11 and fastened fixedly or rigidly to a lower longitudinal link 25u of the respective wheel suspension 11. The movable or flexible fastening of the respective paneling part 14 to the lower transverse link 24u of the respective wheel suspension 11 is realized here preferably by means of a resiliently elastic suspension 26.

The two flow channels 21 and 23, which serve for conducting air to different regions of the respective brake 17, are an integral constituent part of the respective paneling part 14, which also forms the flow-guiding surface 30, wherein said flow-guiding surface 30 covers the respective wheel suspension 11. The respective paneling part 14 is fastened to two links 24u, 25u of the respective wheel suspension 11, which move relative to one another. Advantageous aerodynamic coverage of the respective wheel suspension 11 and cooling of the respective brake 17 can be made possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle, the motor vehicle comprising:
    running gear, the running gear comprising a chassis and wheel suspensions, the wheel suspensions including longitudinal links and transverse links and being for the attachment of wheels to the chassis;
    a body structure, which has an underfloor and/or an underfloor paneling, the underfloor and/or the underfloor paneling exposing the longitudinal links and the transverse links of the wheel suspensions;
    separate paneling parts for the longitudinal links and the transverse links of the wheel suspensions, each of the respective paneling parts having a recess via which air can be fed for cooling purposes to a brake which corresponds to a respective one of the wheels; and
    a flow guide element upstream of a respective separate paneling part of the paneling parts as viewed in a flow direction of the air, the flow guide element being connected to the underfloor or to the underfloor paneling and which, together with the respective separate paneling part, divides up the air flow into:
        a first air flow, which can be fed, upstream of the recess, via a first flow channel of the respective separate paneling part to a first region of the respective brake, and
        into a second air flow, which can be fed via the recess of the respective separate paneling part and via a second flow channel of the respective separate paneling part to a second region of the respective brake.

2. The motor vehicle as claimed in claim 1, wherein the second flow channel of the respective separate paneling part runs downstream of the first flow channel of the respective separate paneling part as viewed in the flow direction of the air and conducts the second air flow to the second region of the respective brake, which is arranged downstream of the first region of the respective brake as viewed in the flow direction of the air.

3. The motor vehicle as claimed in claim 1, wherein the second flow channel of the respective separate paneling part communicates with the recess of the respective separate paneling part.

4. The motor vehicle as claimed in claim 1, wherein the first flow channel of the respective separate paneling part communicates with the flow guide element which is arranged upstream of the respective separate paneling part as viewed in the flow direction of the air.

5. The motor vehicle as claimed in claim 1, wherein between an upstream edge of the respective separate paneling part and the flow guide element which is arranged upstream of the respective separate paneling part as viewed in the flow direction of the air, there is formed an opening which communicates with the first flow channel.

6. The motor vehicle as claimed in claim 1, wherein the first flow channel and the second flow channel are formed together with the respective separate paneling part as a unipartite monolithic assembly.

7. A motor vehicle, the motor vehicle comprising:
    running gear, the running gear comprising a chassis and wheel suspensions, the wheel suspensions including longitudinal links and transverse links for the attachment of wheels to the chassis;
    a body structure, which has an underfloor and/or an underfloor paneling, the underfloor and/or the underfloor paneling exposing the longitudinal links and the transverse links of the wheel suspensions; and
    separate paneling parts for the longitudinal links and the transverse links of the wheel suspensions, a respective separate paneling part of the paneling parts has a recess via which air can be fed for cooling purposes to a brake which is assigned to a respective wheel of the wheels,
    wherein the respective separate paneling part is fastened at one side to a transverse link, of the transverse links of a respective wheel suspension of the wheel suspensions, and at a second side to a longitudinal link, of the longitudinal links of the respective wheel suspension, the respective separate paneling part being fastened fixedly or rigidly to one of the transverse links or the longitudinal link and movably or flexibly to the other of the transverse link or the longitudinal link, in order, firstly, to be movable together with links, of the transverse links and the longitudinal links, of the respective wheel suspension relative to the underfloor and/or the underfloor paneling and, secondly, to permit a relative movement between the links of the respective wheel suspension.

8. The motor vehicle as claimed in claim 7, wherein the respective paneling part is fastened movably or flexibly to a lower transverse link of the respective wheel suspension and is fastened fixedly or rigidly to a lower longitudinal link of the respective wheel suspension.

9. The motor vehicle as claimed in claim 7, wherein the movable or flexible fastening comprises a resiliently elastic suspension.

* * * * *